June 19, 1962 H. BATES ET AL 3,040,027
MANUFACTURE OF CELLULOSE ESTERS
Filed Aug. 9, 1957

3,040,027
MANUFACTURE OF CELLULOSE ESTERS

Harold Bates, Frank Hindley, and Wladislas Popiolek, all of Spondon, near Derby, England, assignors to British Celanese Limited, a corporation of Great Britain
Filed Aug. 9, 1957, Ser. No. 677,259
Claims priority, application Great Britain Aug. 27, 1956
6 Claims. (Cl. 260—227)

This invention relates to the manufacture of cellulose esters, especially cellulose acetates, by a continuous process.

According to the invention cellulose esters are made by causing a mixture comprising initially cellulose, an organic acid anhydride, a solvent for the cellulose ester to be made, and an esterification catalyst to travel through a tubular esterification zone, and in the course of its travel through the said zone to pass through at least one foraminate screen, and preferably through two or more such screens having aperatures of successively smaller size.

In the preferred method of working, the mixture is moved through the first part of the tubular esterification zone by means of a forwarding device which acts continuously and directly on the mixture, preferably a screw conveyor, and is then forced through the remainder of the zone, which contains the foraminate screen or screens, by the pressure exerted on the mixture by the forwarding device. The length and rate of operation of the forwarding device should be at least sufficient to give time for the mixture, before it leaves it, to become essentially a "dope," i.e. a solution of completely or nearly completely esterified cellulose in the solvent, which however may, and usually will, still contain a proportion of incompletely esterified fibrous material.

The apertures in the foraminate screens may be between about 0.1 and 0.01 inch across, and it is preferable to employ three or even more screens of diminishing aperture size. These screens may advantageously comprise sheets of wire gauze or the like, though they may have some other form; for example they may consist of perforated plates. One example of a suitable combination is the use of three sheets of wire gauze of mesh 20, 60 and 100 respectively, though it will be understood that these figures can be varied, for instance by up to 20% each way. The several foraminate screens may all be spaced fairly widely one from the other, or two or more of them may be either in contact or closely spaced, for example by about ⅛ inch to 3 or 4 inches. One arrangement which has been found to be very effective is to provide first a 20 mesh and a 60 mesh wire gauze in contact with one another, and then, about 10 inches further on, a 100 mesh wire gauze. These figures are of course given only by way of example and may be varied as already indicated. The optimum distance between successive screens which are not in contact will generally be greater the greater the rate of travel of the mixture through the tubular zone. Whatever the arrangement of the screens among themselves, the best results are obtained when the first screen is close to the output end of the forwarding device, for example between 3 and 12 inches from it.

The most important function of the screens appears to be to promote the dispersion of unesterified or partly esterified fibers throughout the dope, with the result that their complete acetylation is considerably accelerated. A secondary effect is to hold up unesterified and partly esterified fibers until they are at least sufficiently esterified to dissolve. Impurities which are insoluble in the dope are of course held up indefinitely and collect on the screens; it may therefore be necessary, after an operating period which will depend on the quality of the cellulose starting material, to clean or change one or more of the screens. This can advantageously be done by using screens mounted in sliding frames, so that a fouled screen can be replaced by a clean one without interrupting the process.

The method of the invention can be used with advantage in a wide variety of esterification processes of the solution type. One such process is the acetylation of cellulose using acetic acid as the solvent, and as catalyst sulphuric acid in amount about 10–15% of the weight of the cellulose; in this process the temperature of the reactants is usually not allowed to rise above a peak of about 35°–45° C., and this necessitates cooling the mixture at first so as to absorb the greater part of the heat of reaction; however in the latter stages cooling will not be required, and indeed it may be advisable to supply heat to the reactants in order to keep their temperature within this range.

Another acetylation method using acetic acid as solvent and sulphuric acid as catalyst, which has the advantage of being able to give a product of about the highest possible acetyl content (namely 62.5% reckoned as acetic acid) is described in U.S. application S. No. 517,372 filed June 1, 1955. This employs reaction temperatures of 50°–100° C. or more in conjunction with greatly reduced amounts of catalyst, usually less than 1%, this catalyst being introduced into the cellulose in the course of an activating pretreatment. When working this process it may be necessary to supply heat to the reactants from their first entry into the acetylation zone.

Yet another method uses as the solvent methylene or ethylene chloride, the latter being more convenient when working in accordance with the present invention on account of its higher boiling point; in this case also quite small amounts of sulphuric acid are sufficient, e.g. about 0.75–2.5%, and the temperature can be allowed to rise higher than is advisable when using larger amounts, e.g. to between 45° and 65° C. Lower temperatures can be used if desired, but the acetylation will naturally then be slower, and the process less well adapted for continuous operation. Processes involving the use of catalysts other than sulphuric acid, e.g. perchloric acid, can also be carried out in accordance with the invention.

As in cellulose esterifications in general, the product obtained directly in accordance with the invention is more or less completely esterified, and is a so-called triester. For some purposes such triesters, especially cellulose triacetate, are very useful, and they may be obtained by precipitation from the esterification solution in a known way, if desired after a very short hydrolysis or "ripening" step to split off any combined sulphuric acid. Alternatively cellulose triacetate solutions obtained by the new process may be spun into filaments or other articles, preferably after completely neutralising the catalyst, but without any intervening precipitation and re-solution operation, for example as described in U.S. application S. No. 679,516, filed August 21, 1957. On the other hand cellulose esters of lower acetyl value, e.g. acetone-soluble cellulose acetates of acetyl value, reckoned as acetic acid, between about 52.5 and 56%, may be produced by ripening the ester first formed before precipitating it or using the acetylation solution for any purpose.

The invention includes also apparatus in which the process described above can be carried out, comprising a tubular vessel, which may be horizontal or vertical or at an angle between the two, a forwarding device in the vessel adapted to act continuously and directly on solid and liquid material in the vessel and extending part way along the vessel from one end thereof, a hopper or like feeding device leading into the vessel at or near the same end and adapted to feed solid and liquid material to the said forwarding device, and one or more foraminate screens extending across the vessel beyond the forwarding device. Preferably the vessel is provided with a jacket or jackets for the passage of a heating or cooling fluid or with other heating or cooling means. The forwarding device may be separately heated or cooled if desired, e.g. by providing it with internal ducts for the passage of a heating or cooling fluid.

The forwarding device is preferably a screw conveyor of constant volume per unit length, and it may occupy anything up to half or even two-thirds or more of the length of the vessel, depending on the conditions which are to be employed. The foraminate screen or screens are arranged beyond the end of the forwarding device in the manner already described.

The vessel may conveniently be made in sections, one of which houses the forwarding device, while the remainder are empty. These sections may for example be provided with flanges on their ends by means of which they may be bolted together, and the foraminate screens may then be held tightly between the flanges of adjacent sections and the joints made tight by means of suitable packing washers or the like. With this arrangement each section will be provided with its own jacket or other heating or cooling means, though these may be connected to each other so that a single stream of heating or cooling fluid for example serves to heat two or more of the sections.

The output end of the vessel is preferably provided with an outlet of restricted cross-sectional area such that the rate of discharge of the dope is governed solely by the rate at which the esterification mixture is forced through the vessel by the forwarding device.

Two forms of continuous acetylator in accordance with the invention are illustrated in the accompanying drawing, in which.

Figure 1:
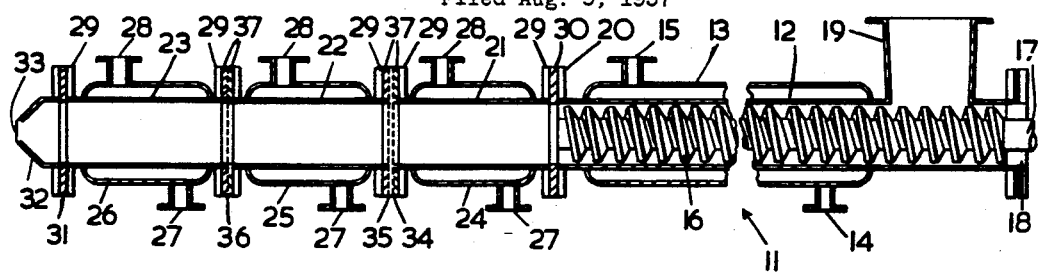
FIGURE 1 is a side view in section of one of these forms of apparatus.

Referring now to the drawing, the apparatus illustrated in FIGURE 1 comprises a forwarding section 11, consisting of a tube 12 provided over most of its length with a heating jacket 13 having an inlet 14 and an outlet 15 for a heat exchange fluid. A constant volume screw conveyor 16 driven through a shaft 17 mounted in a bushing 18 extends through the whole length of the tube 12, and a feed hopper 19 opens into the tube 12 near its input end. At its output end the tube 13 carries a flange 20.

The apparatus also comprises three tubular extension sections 21, 22 and 23 arranged in series, whose total length is less than the length of the tube 12. These extension sections are provided with heating jackets 24, 25 and 26 respectively, each jacket having an inlet 27 and an outlet 28 for a heat exchange fluid. The extension sections all carry a flange 29 at each end. The flange at the input end of the first extension section 21 serves to connect this section through a packing washer 30 and the flange 20 to the tube 12, and that at the output end of the third extension section 23 serves to connect this through a packing washer 31 to a conically shaped outlet member 32 having a discharge orifice 33 of diameter about one-fifth or less of that of the tube 12 and the extension sections 21, 22 and 23. The remaining flanges serve to connect the extension sections to each other, and also to hold in position two foraminate screens 34 and 35 between the first and second extension sections, and another 36 between the second and third. The first and second screens 34 and 35 are of 20 mesh wire gauze and 60 mesh wire gauze respectively, while the third 36 is of 100 mesh wire gauze. Packing washers 37 are provided to prevent leakage of liquid between the ends of adjacent extension sections.

In operation a mixture of pretreated (activated) cellulose with acetic anhydride, an acetylation solvent (e.g. acetic acid or ethylene dichloride) and a catalyst such as sulphuric acid is introduced through the feed hopper 19 into the tube 12, through which it is caused to travel by the screw conveyor 16. A cooling or heating fluid is passed through the space between the jacket 13 and the tube 12 as may be necessary. By the time it has reached the output end of the tube 12 the cellulose has been acetylated to a sufficient extent to form a fluid dope or solution, which then passes through the extension sections 21, 22 and 23 under the influence of the pressure generated by the screw conveyor 16, and in the course of its travel through these sections passes through the screens 34, 35 and 36. The extension sections are also heated or cooled in accordance with the requirements of the reaction by passing a heat exchange fluid or fluids through the jackets 24, 25 and 26. Finally the acetylation solution is extruded through the discharge orifice 33 into a precipitating device (not shown).

Figure 2:
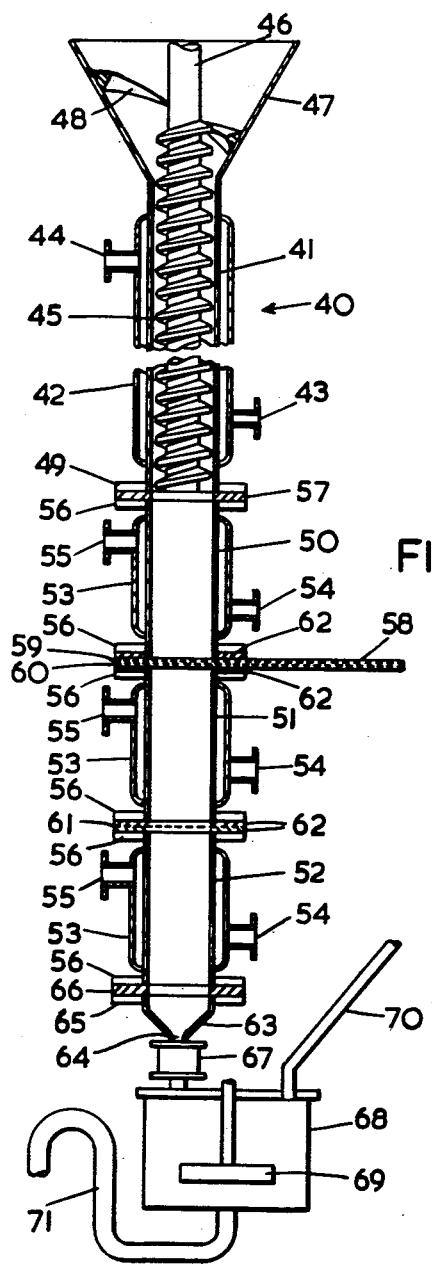
FIGURE 2 is a side view in section of the other.

The form of apparatus illustrated in FIGURE 2 closely resembles that of FIGURE 1 except that it is arranged for vertical operation. In it a forwarding section 40 comprises a vertical tube 41 provided with a jacket 42 having an inlet 43 and outlet 44 for a heat exchange fluid, and containing a constant volume screw conveyor 45 adapted to be driven through a shaft 46. The upper end of the tube 41 carries a feed hopper 47, into the lower part of which the screw conveyor 45 extends. A spiral rib 48 is attached to the inner wall of the hopper 47 and serves to direct material in the hopper to the screw conveyor and so enable a uniform and continuous feed to be maintained. The lower end of the tube 41 carries a flange 49.

Connected in series below the lower end of the tube 41 are three extension sections 50, 51 and 52, each provided with a jacket 53 having an inlet 54 and outlet 55 for a heat exchange fluid, and carrying a flange 56 at each end. The total length of the three extension sections is just under half that of the tube 41 of the forwarding section 40. The flange at the upper end of the topmost extension section 50 serves to connect this section through a packing washer 57 and the flange 49 to the tube 41. Between the lower flange of the topmost extension section 50 and the upper flange of the middle extension section 51 a sliding carrier 58 is inserted, by means of which a pair of superimposed foraminate screens 59 and 60 can be held between the two extension sections, and replaced at will by clean screens without interrupting the passage of acetylation solution through the apparatus. Another foraminate screen 61 is held between the middle extension section 51 and the lowest extension section 52. The foraminate screens 59, 60 and 61 consist of 20 mesh, 60 mesh and 100 mesh wire gauze respectively. Packing washers 62 serve to prevent leakage of liquid from between the extension sections.

An outlet member 63, which contracts to a discharge orifice 64 of diameter about one-fifth that of the tube 41 and the extension sections 50, 51 and 52, carries a flange 65 by means of which it is connected through a packing washer 66 to the lower flange of the lowest extension section 52. The discharge orifice 64 opens into a sight glass 67, which in turn leads to a neutralising tank 68 provided with a stirrer 69 and an inlet 70 for liquid comprising a neutralising agent. A constant level discharge pipe 71 leads from the bottom of the neutralising tank 68.

The operation of this device is similar to that of FIGURE 1. The mixture of pretreated cellulose, acetic anhydride, solvent and catalyst is fed into the tube 41 from the hopper 47, and carried down it at a controlled rate by the screw conveyor 45. By the time the mixture has reached the topmost extension section 50 it has become a fluid dope, and as such it is forced by the pressure generated by the screw conveyor 45 through the three extension sections and the foraminate screens, the discharge orifice 64 and the sight glass 67 into the neutralising tank 68. Here it is intimately mixed by means of the stirrer 69 with a neutralising agent, e.g. magnesium acetate introduced as a solution in acetic acid through the inlet 70, after which it is led away through the discharge pipe 71 for such use or further treatment as may be desired.

If the superimposed screens 59 and 60 should become blocked by insoluble material, they can be replaced by fresh clean screens by means of the sliding carrier 58 without interrupting the process.

The invention is further illustrated by the following examples, in which all the "parts" mentioned are by weight.

*Example 1*

Cotton linters (100 parts) were pretreated with 50 parts of glacial acetic acid for 2 hours at room temperature and then mixed with 600 parts of acetic anhydride, 315 parts of acetic acid and 1.65 parts of sulphuric acid, the temperature of the mixture being kept at about 8°–10° C. The mixture was then introduced into the hopper 19 of the acetylator illustrated in FIGURE 1, and was fed to the screw conveyor 16, by means of which it was forced through the acetylator. The temperature of the tube 12 and the extension sections 21, 22, 23 was kept at about 60° C. The screw conveyor was driven at such a rate that the residence time of the mixture was about 18 minutes. The dope issuing from the discharge orifice 33 was precipitated by leading it in a large volume of water, and the resulting precipitate of cellulose triacetate was washed and dried. On analysis it showed an acetyl value reckoned as acetic acid of approximately 62.5%, indicating complete acetylation. It dissolved in a mixture of 90 volumes of methylene chloride to 10 volumes of methanol to give a 20% solution of good clarity.

*Example 2*

In this example the vertical acetylator illustrated in FIGURE 2 was employed.

100 parts of cotton linters were pretreated with 50 parts of glacial acetic acid for 2 hours at room temperature, and then added to a pre-cooled mixture of 266 parts of acetic anhydride, 365 parts of acetic acid and 14 parts of sulphuric acid. The resulting mixture was fed to the screw conveyor 45 by the hopper 47, and was carried through the tube 41 and then forced through the extension sections 50, 51 and 52 and the screens 59, 60 and 61 in an average time of 100 minutes. Finally it passed through the sight glass 67 into the neutralising tank 68, in which it was mixed with enough of a solution of magnesium acetate in acetic acid, introduced through the inlet 70, to neutralise all the sulphuric acid and provide a 10% excess. The neutralised solution was withdrawn through the constant level discharge pipe 71, and could be used as a spinning solution for the manufacture of cellulose triacetate filamentary materials by a process described in British application No. 25780/56 or British application No. 20490/57.

In this case, owing to the greater concentration of sulphuric acid in the acetylation mixture, it was necessary at first to cool the reactants, and this was done by passing cold water through the jacket 42 at a rate such that its temperature did not rise above 13° C. On the other hand the extension sections were kept at about 40° C.

*Example 3*

Cellulose, activated as in the previous examples, was mixed with 350 parts of acetic anhydride, 500 parts of ethylene dichloride and 1.5 parts of sulphuric acid. The mixture was introduced into the apparatus illustrated in FIGURE 2 and passed through it in an average time of 27 minutes. The temperature of the tube and the extension sections was maintained at about 55° C. throughout. The cellulose triacetate produced had an acetyl value of 62.0% reckoned as acetic acid.

Although the invention has been described with particular reference to the production of cellulose triacetate it can as already indicated also be used in the production of other cellulose esters of organic acids, especially cellulose acetates of lower acetyl value and cellulose esters of lower fatty acids, i.e. fatty acids containing up to 4 carbon atoms in the molecule, such as cellulose propionate, butyrate, acetate propionate and acetate butyrate.

Having described our invention, what we desired to secure by Letters Patent is:

1. Process for the manufacture of cellulose esters on a continuous basis, which comprises causing a mixture comprising initially cellulose, an organic acid anhydride, a solvent for the cellulose ester to be made, and an esterification catalyst to pass through a tubular esterification zone, and in the course of its travel through the said zone successively obstructing particles of 16–24 mesh size, 48–72 mesh size and 80–120 mesh size, said particles comprising unesterified and partly esterified fibres and insoluble impurities which may be present.

2. Process according to claim 1, wherein the mixture comprises an anhydride of a fatty acid containing 2–4 carbon atoms in the molecule and a cellulose ester of such an acid is made.

3. Process according to claim 1, wherein the mixture comprises acetic anhydride and a cellulose acetate is made.

4. Process according to claim 1, wherein the mixture has become a solution of esterified cellulose in the solvent before said particles of 16–24 mesh size are obstructed.

5. Process according to claim 1, wherein the mixture passes downwards through a substantially vertical tubular esterification zone.

6. Process according to claim 1, wherein the first part of the tubular estification zone is a forwarding zone through which said mixture is moved continuously and directly at least until it has become essentially a solution of esterified cellulose in the solvent, and said particles of 16–24 mesh size are obstructed at a distance between 3 and 12 inches from the output end of the said forwarding zone.

References Cited in the file of this patent

UNITED STATES PATENTS

| | | |
|---|---|---|
| 2,435,228 | Mann | Feb. 3, 1948 |
| 2,490,643 | Malm | Dec. 6, 1949 |
| 2,498,010 | Seymour et al. | Feb. 21, 1950 |
| 2,502,726 | Horton | Apr. 4, 1950 |
| 2,521,916 | Hincke et al. | Sept. 12, 1950 |
| 2,600,871 | Helwig | June 17, 1952 |
| 2,739,879 | Bates et al. | Mar. 27, 1956 |
| 2,801,237 | Clevy et al. | July 30, 1957 |